US005353903A

United States Patent [19]

Kechel et al.

[11] Patent Number: 5,353,903

[45] Date of Patent: Oct. 11, 1994

[54] TRANSFER BRIDGE FOR LETTER SORTING SYSTEMS

[75] Inventors: Otmar Kechel, Stockach; Dieter Altenburg, Allensbach; Werner Frank, Reichenau; Armin Zimmermann, Constance, all of Fed. Rep. of Germany

[73] Assignee: Licentia Patent-Verwaltungs-GmbH, Frankfurt, Fed. Rep. of Germany

[21] Appl. No.: 143,143

[22] Filed: Oct. 29, 1993

[30] Foreign Application Priority Data

Oct. 29, 1992 [DE] Fed. Rep. of Germany ....... 4236507

[51] Int. Cl.[5] .............................................. B65G 37/00

[52] U.S. Cl. ........................................... 193/3; 193/4; 198/535; 198/536; 198/574

[58] Field of Search ........................ 198/535, 536, 574; 193/3, 4, 38

[56] References Cited

U.S. PATENT DOCUMENTS 2,421,365 5/1947 Patrick ............................ 198/574 X
4,763,771 8/1988 Geerts ............................. 198/574 X

FOREIGN PATENT DOCUMENTS 2008521 9/1970 Fed. Rep. of Germany .
7003430 12/1971 France .

OTHER PUBLICATIONS

"Ahead Worldwide: Automatic Address Readers from AEG Olympia", System Brief, K2V37.6.216/1288, pp. 2-19.

*Primary Examiner*—Cheryl L. Gastineau
*Attorney, Agent, or Firm*—Spencer, Frank & Schneider

[57] ABSTRACT

A letter sorting system includes a row of juxtaposed stack compartments; a material intake device arranged along and spaced from the compartments; a carriage arranged for travel along the compartments; and a transfer bridge mounted on the carriage to be displaced thereby along the compartments. The transfer bridge includes an exterior frame pivotally attached to the carriage for pivotal motions into first and second positions; an interior frame pivotally attached to the exterior frame for pivotal motions into first and second positions; and a slide having a first part attached to the interior frame and a second part attached to the exterior frame. Dependent upon simultaneous positions of the exterior and interior frames, the transfer bridge may assume first, second and third operating positions. In the first operating position sliding surfaces of the first and second parts of the slide form a continuous, upwardly facing surface for guiding material thereon between a selected compartment and the material intake device. In the second operating position a part of the interior frame is oriented upwardly and is adapted to accommodate a container thereon; and in the third operating position the first and second parts of the slide are substantially in a vertical orientation.

11 Claims, 4 Drawing Sheets

TRANSFER BRIDGE FOR LETTER SORTING SYSTEMS

CROSS REFERENCE TO RELATED APPLICATION

This application claims the priority of German Application No. P 42 36 507.4 filed Oct. 29, 1992, which is incorporated herein by reference.

BACKGROUND OF THE INVENTION

The present invention relates to a transfer bridge for letter sorting systems.

In prior art letter sorting systems, pieces of mail (particularly letters) are sorted, possibly after a presorting process, and deposited into a plurality of stack compartments or the like.

Such letter sorting systems are disclosed, for example in German patent document 2,008,521 and French patent document 7,003,430. Depending on the sorting process involved, the degree at which the sorting can be effected is determined by the number of stack compartments into which the mail is distributed. Particularly in the U.S. postal system, the items are to be sorted in the sequence in which the mail carrier distributes them during his rounds. For this purpose, in order to be able to work with a relatively small number of stack compartments, the mail is sorted several times as will be described in greater detail below. In the known, so-called sequencing process, to be described in greater detail below, it is possible to use a sorting system having ten stack compartments in three sorting passes, which represents a sequence of up to a thousand stops on the carrier route.

The sequencing of any desired number of mail items for eight hundred stops in a sorting system equipped with ten stack compartments and three sorting passes will be accomplished as follows:

The "stops" in the sequence are divided into eight successive groups of one hundred stops each. Each group is again subdivided into ten subgroups of ten stops each.

In the first sorting pass, the mail pieces assigned to stops 1 are deposited in the first stack compartment independently of whether a stop belongs to a group or a subgroup; pieces for stops 2 and 3 are deposited in the second and third stack compartments, respectively, and so on.

During the second sorting pass, the ten stack compartments are sequentially assigned to the ten subgroups. The pieces of mail assigned to stops 1 are sequentially distributed from the first stack compartment into the ten stack compartments depending on their subgroup, but independently of their association with a specific group. Then the mail pieces assigned to stops 2 from the second stack compartment are distributed to the ten stack compartments, etc.

During the third sorting pass, eight of the stack compartments are assigned sequentially to the eight groups. The mail pieces from the first stack compartment of the second sorting pass, which includes the ten stops from all first subgroups of all groups, are sorted sequentially corresponding to their group number. Then the second subgroups from the second stack compartment are sorted sequentially, etc.

In order to realize an economical progress in the three or more sorting passes, a letter sorting system disclosed in AEG brochure K2V37.6.216/1288, page 4, provides that the stack compartments are arranged opposite the material intake device so that, after each sorting pass that is to be followed by another sorting pass, the mail can be manually rapidly returned to the intake section from the stack compartments. For this purpose, the sorting system has an essentially U-shaped configuration in which one leg is formed by the material intake device and the other leg by the juxtaposed stack compartments.

A prerequisite for sequencing according to the above-described method is that the sequence integrity of the items, that is, the sequence of the items during the second and subsequent sorting passes and during the re-input, must be strictly maintained. However, when manually transferring the mail from the stack compartments to the intake device, there is a risk that the sequence integrity is lost if stacks of mail as a whole or in part are removed from the stack compartment by operating personnel and placed into the intake device. In order to overcome this problem, it is possible to use containers into which the mail pieces can be loaded after the initial sorting pass before being transported for re-input and unloaded into the intake device. However, the use of such containers can be complicated. Moreover, the risk has not been eliminated during loading and unloading of the stacks into and out of the containers that the sequence of the stacks is disturbed, either because items are pushed over one another, or because stacks are disarranged.

SUMMARY OF THE INVENTION

It is an object of the present invention to provide an improved letter sorting system which, while maintaining sequence integrity, permits simple, fast and reliable transfer of the mail from the stack compartments into the material intake device of the system.

It is another object of the present invention to provide an apparatus which improves the transfer of the mail into transporting containers after the mail has been sorted.

It is yet another object of the invention to provide a transfer bridge which ensures easy access for operating personnel to the stack compartments and the material input device of a letter sorting system.

These objects and others to become apparent as the specification progresses, are accomplished by the present invention, according to which, briefly stated, the letter sorting system includes a row of juxtaposed stack compartments; a material intake device arranged along and spaced from the compartments; a carriage arranged for travel along the compartments; and a transfer bridge mounted on the carriage to be displaced thereby along the compartments. The transfer bridge includes an exterior frame pivotally attached to the carriage for pivotal motions into first and second positions; an interior frame pivotally attached to the exterior frame for pivotal motions into first and second positions; and a slide having a first part attached to the interior frame and a second part attached to the exterior frame. Dependent upon simultaneous positions of the exterior and interior frames, the transfer bridge may assume first, second and third operating positions. In the first operating position sliding surfaces of the first and second parts of the slide form a continuous, upwardly facing surface for guiding material thereon between a selected compartment and the material intake device. In the second operating position a part of the interior frame is oriented upwardly and is adapted to accommodate a container thereon; and in the third operating position the first and second parts of the slide are substantially in a vertical orientation.

The invention is based on the concept of providing a slide for the material transfer so as to permit reliable guidance for the stacks of items, and is also based on the concept of providing means which accommodate transporting containers and which is connected with the slide. The slide is displaceable along the row of stack compartments and is pivotal so as to ensure easier operation and unimpeded access to the letter sorting system. In the transfer position, the transfer bridge according to the invention constitutes a thoroughgoing slide path between a respective stack compartment and the material intake device opposite thereto, while in the unloading position, it is able to accommodate transporting containers to be loaded from the stack compartments.

DETAILED DESCRIPTION OF THE PREFERRED EMBODIMENT

Figure 1:
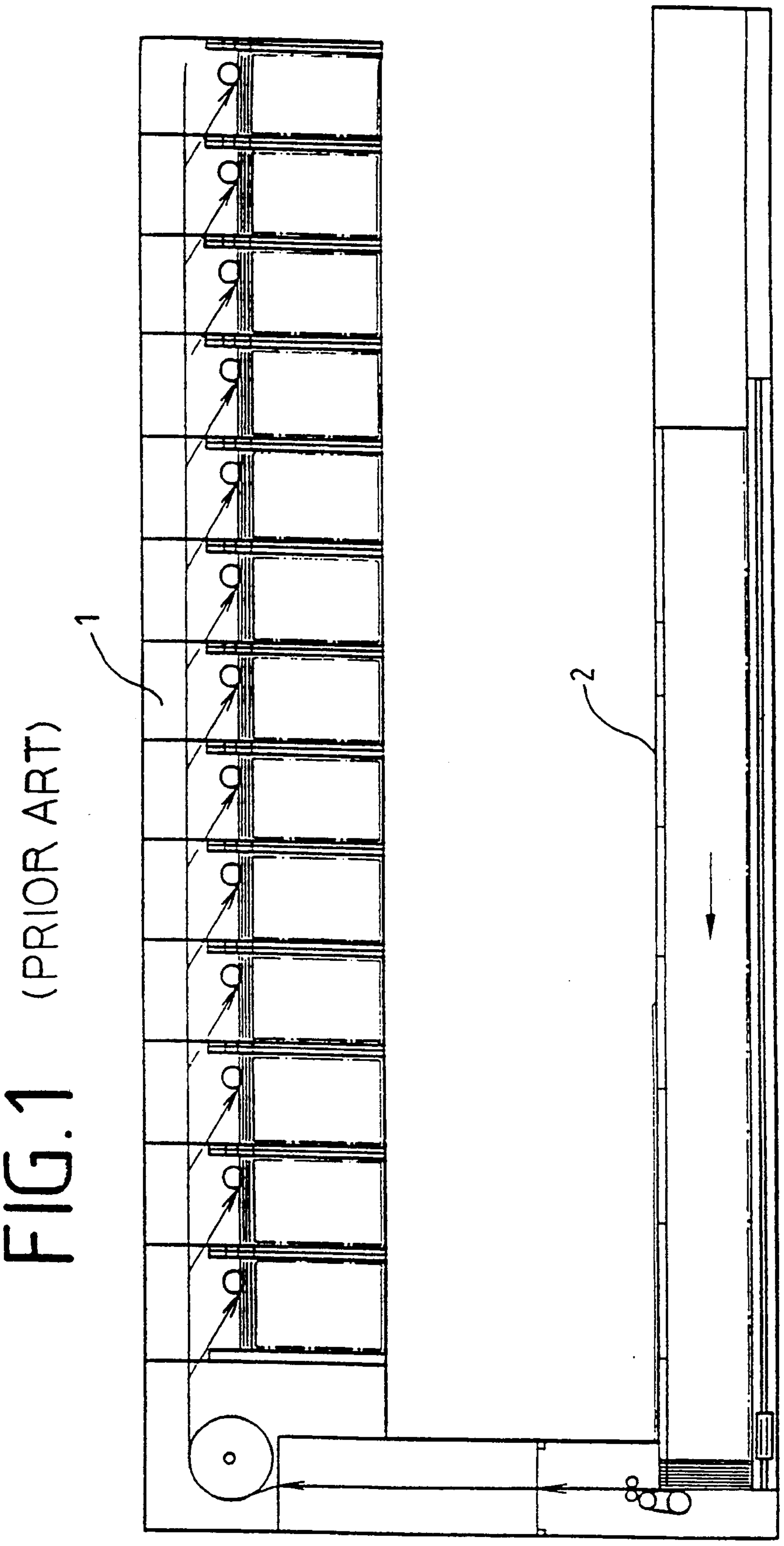
FIG. 1 (PRIOR ART)
FIG. 1 is a schematic top plan view of a prior art letter sorting system.

FIG. 1 shows a prior art letter sorting system of essentially U-shaped configuration. The letter sorting system of FIG. 1 includes a series of stack compartments 1 into which items previously loaded into intake device 2 are distributed with the aid of a computer controlled sorting device. In the transfer bridge according to the present invention, the items already processed in an earlier sorting pass and stacked in the stack compartments are again supplied to the intake device 2, or, at the end of the last sorting pass, into transporting containers. The transfer bridge according to the invention is highly effective in ensuring sequence integrity, that is, in ensuring that a sequence of the sorted items during the second and subsequent loading passes and during the re-input is strictly maintained. Thus, the reloading for the second and subsequent sorting passes can be started, in order to minimize the total sorting time, as soon as the items of the first stack compartment have been transferred to the material intake device. The above is made possible by the mere provision of at least two separating blades in the stack compartments in order to separate from one another the items belonging to different sorting passes.

Figure 2:
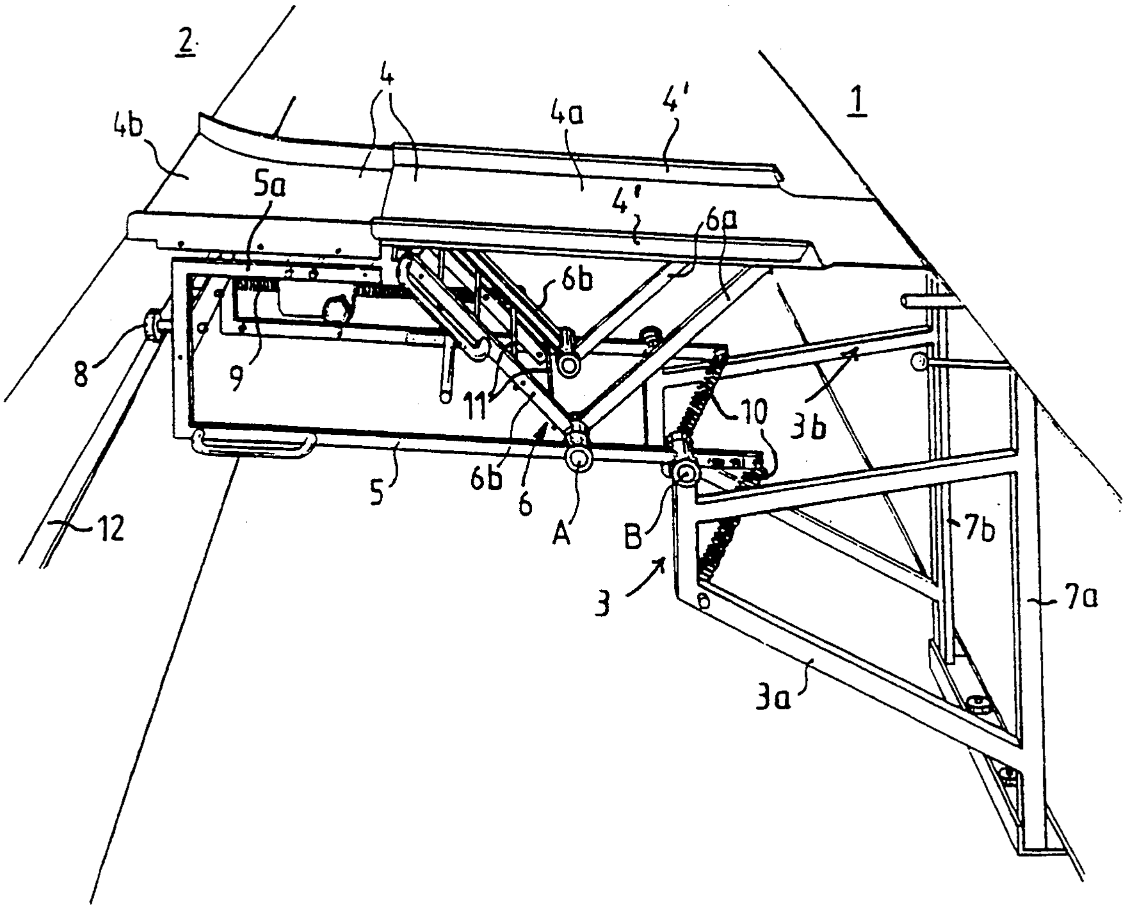
FIG. 2 is a perspective view of a preferred embodiment of a transfer bridge according to the invention, shown in the transfer position (first operating position).

FIG. 2 depicts the transfer device according to the invention in the transfer position (first operating position) which is one of three possible operating positions. A carriage 3 transports the transfer bridge alongside the row of stack compartments 1. Carriage 3 is composed of two parallel, facing, trapezoidal frames **3*a*, 3*b* each having an essentially vertically oriented base 7*a*, 7*b*, respectively. The transfer bridge is essentially formed of a slide 4 and frames 5 and 6** as it will be described in greater detail below.

In the first operating position, the surface of a slide 4 forms a continuous slide path between the outlet of the stack compartments 1 and the material intake 2. The slide 4 is composed of a first part **4*a* and a second part 4*b*. An exterior frame 5 composed of two parallel, facing, essentially U-shaped frames, is oriented, with the opening of the U, toward carriage 3. Second part 4*b* is attached to the upper legs 5*a* (only one visible) of exterior frame 5. Exterior frame 5 is pivotally connected with carriage 3 at B. First part 4*a* of the slide 4 is pivotally attached to an interior frame 6 at location A thereof which is spaced from the pivot location B. The interior frame 6 is composed of two parallel, facing, V-shaped (triangular) frames comprising legs 6*a* and 6*b*. The frame 6 is upright (that is, the open side of the V-shaped frames is oriented upwardly) when the transfer device is in the first operating position in which sliding surfaces of parts 4*a* and 4*b* of the slide 4 form a thoroughgoing slide path on which the items are pushed, in stack form, from a stack compartment 1 toward the material intake 2 during the sorting process. As shown in FIG. 1, part 4*b* is flared in a direction toward the material intake device 2**.

To guide the items and prevent them from sliding off the slide 4 in the event that the latter is inadvertently displaced, guide means (lateral guide rails) 4' are provided on both sides of the slide 4 at lateral edges thereof.

Figure 3:
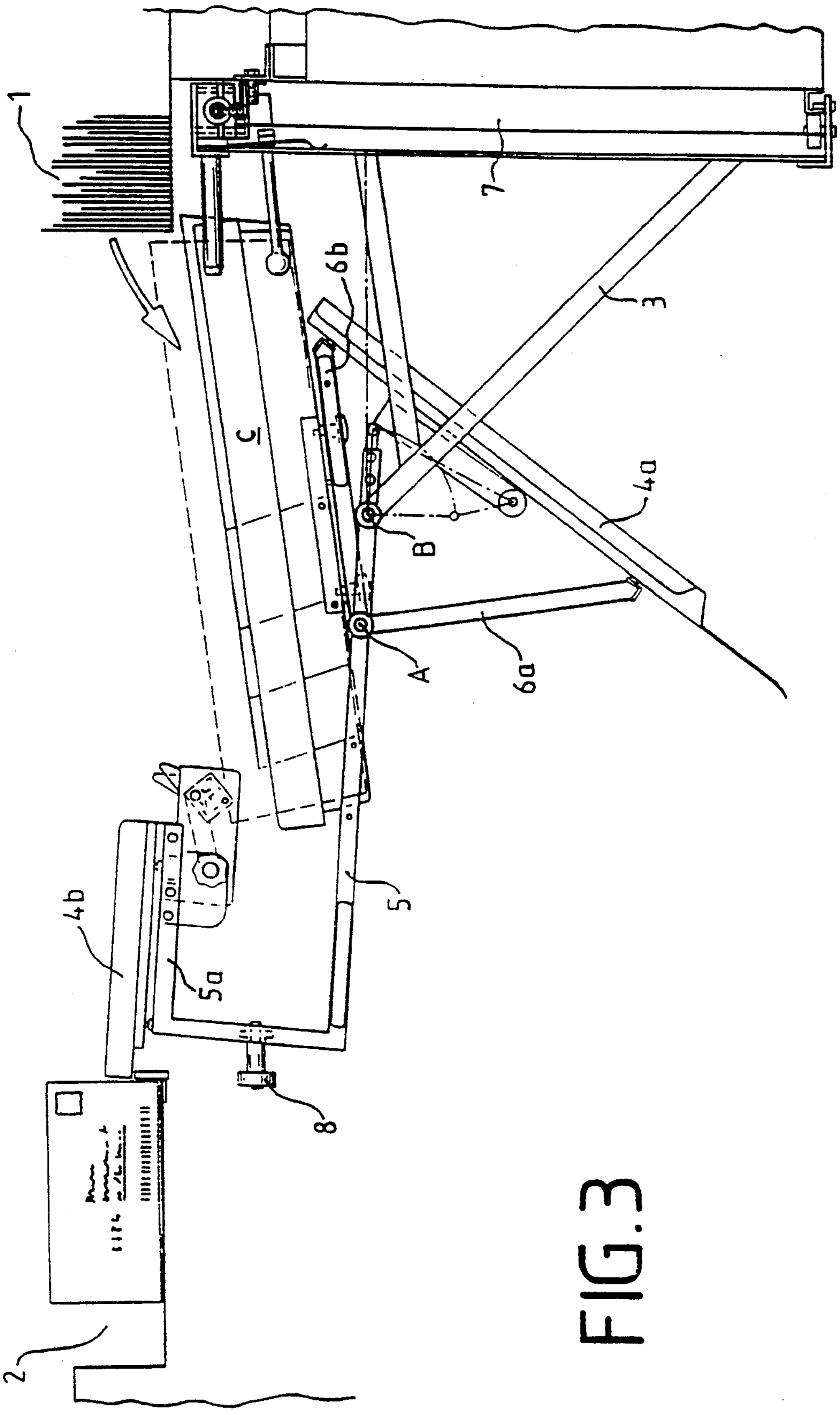
FIG. 3 is a side elevational view of the preferred embodiment, shown in the unloading position (second operating position).

FIG. 3 shows the transfer bridge of the present invention in an unloading position (second operating position). To assume the second operating position, the interior frame 6 is pivoted relative to the exterior frame 5 about a pivot axis which passes through A so that part **4*a* of slide 4 is sloped obliquely and faces downward, while the legs 6*b* of the frame 6 are on top and are oriented essentially horizontally. Thus, in this position of the interior frame 6 legs 6*b* provide a support surface for transporting containers, such as container c, on interior frame 6** when the stack compartments are being unloaded.

Figure 4:
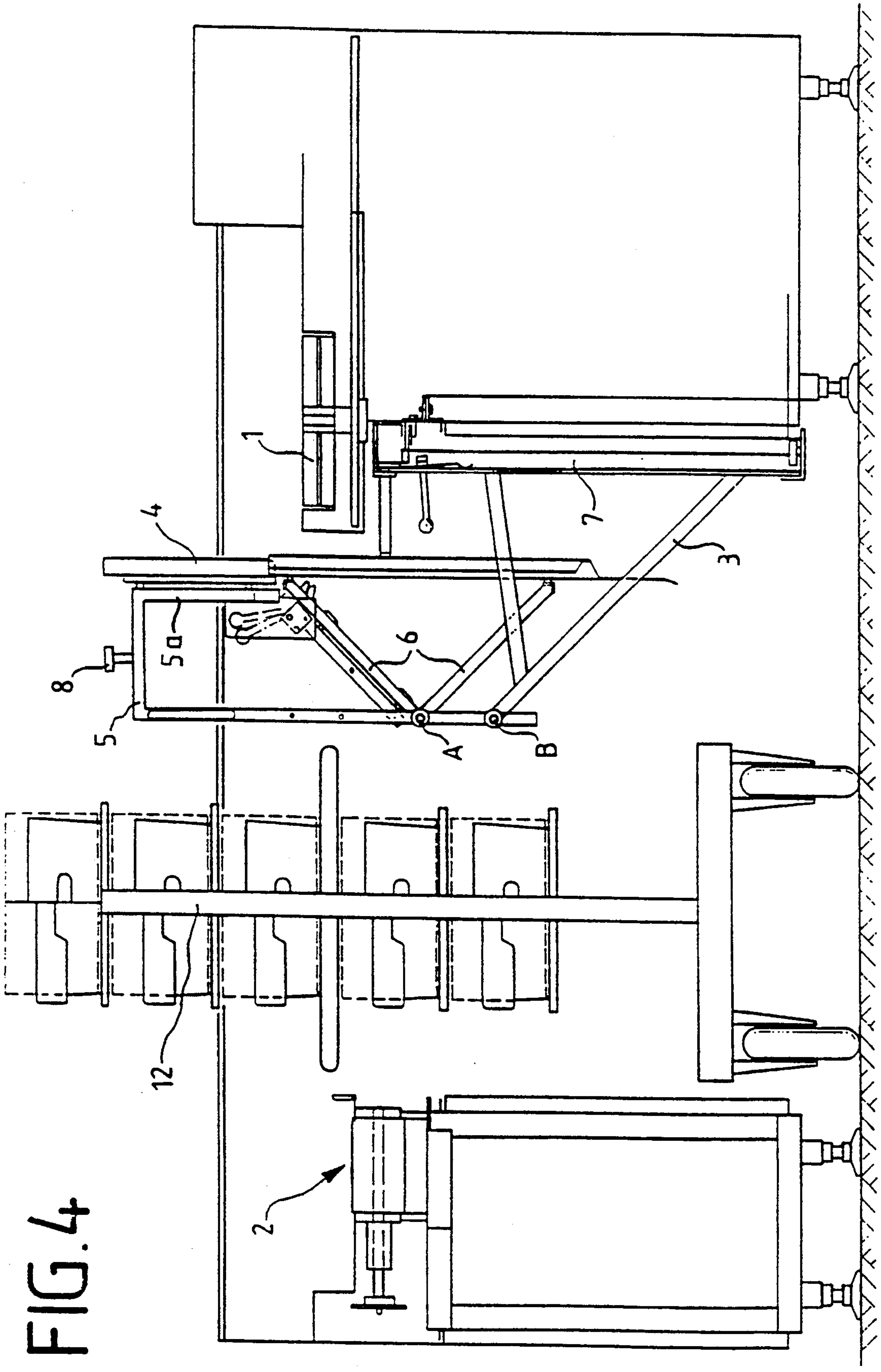
FIG. 4 is a side elevational view of the preferred embodiment, shown in the passage position (third operating position).

A passage position of the transfer bridge (third operating position) is shown in FIG. 4. In this position, the orientation of interior frame 6 relative to exterior frame 5 is the same as in the first operating position. However, exterior frame 5 is now pivoted relative to carriage 3 about a pivot axis passing through B such that the transfer bridge as a whole (formed of the slide 4 and the frames 5 and 6) is pivoted in an upward direction into a position in which parts **4*a* and 4*b*** are oriented essentially vertically.

Thus, exterior frame 5 is pivotal between a first position where second part **4*b* is horizontal, and a second position where part 4*b* is vertical. Further, interior frame 6 is pivotal between a first position where first part 4*a* cooperates with second part 4*b* to form a continuous surface on slide 4, and a second position where part 4*a* is sloped obliquely and faces downward, thereby allowing the interior frame to accommodate transferring containers thereon. Thus, the first operating position of the transfer bridge, shown in FIG. 2, corresponds to the instance where both exterior and interior frames are in their first positions as described above. The second operating position shown in FIG. 3, on the other hand, corresponds to the instance where the exterior frame is in its first position, and the interior frame in its second position. Finally, the third operating position, depicted in FIG. 4**, shows the exterior frame in its second position, and the interior frame in its first position.

In the first operating position, the transfer bridge according to the invention permits a rapid and simple reloading of the items from the stack compartments 1 into the material intake device 2 while retaining sequence integrity. For this purpose, the transfer bridge is displaced along the row of stack compartments, and is latched or fixed to the stack compartment to be unloaded. The items can then be pushed out of the stack compartment, placed onto the slide 4 which now forms a continuous slide path, and introduced into the material intake 2. It is advantageous to support the transfer bridge in the first position by a support 8 which engages a countersupporting surface 12 on the side of the material intake device 2 facing the transfer bridge. It is further of advantage to provide means, such as, for example, springs 9 and 10, for dynamically stabilizing the transfer bridge in all three operating positions.

If, after the last sorting pass, the items are no longer to be returned to material intake device 2 but are instead to be transported away for further processing, the transfer bridge can be brought into the second operating position, as shown in FIG. 3. Between part **4*b* of the slide 4 which is connected with exterior frame 5 and stack compartments 2, there is now sufficient space for the accommodation of transporting containers, such as container c. To increase the structural stability of the transfer bridge, it is advantageous to provide webs 11 between the essentially horizontally oriented pair of legs 6*b* of the interior frame 6. The provision of webs 11 also serves for reliably accommodating the transporting containers on legs 6*b* of the interior frame 6. It will be readily understood that the transfer bridge must be so dimensioned that the transporting containers accommodated on the transfer bridge are arranged below the stack compartments 1** to such an extent that it is possible to easily load the items into the transporting containers without having to lift the items.

In the third operating position, that is, with the transfer bridge pivoted upward as shown in FIG. 4, sufficient space is available in the region between the stack compartments 1 and the material intake device 2 to ensure access by operating personnel and, if required, to transport the transporting containers away from the sorting region with the aid of transporting carriages.

It will be understood that the above description of the present invention is susceptible to various modifications, changes and adaptations, and the same are intended to be comprehended within the meaning and range of equivalents of the appended claims.

What is claimed is:

1. A letter sorting system comprising (a) a row of juxtaposed stack compartments;

(b) a material intake device arranged along and spaced from the compartments;

(c) a carriage arranged for travel along the compartments; and (d) a transfer bridge mounted on the carriage to be displaced thereby along the compartments; said transfer bridge including (1) an exterior frame pivotally attached to said carriage for pivotal motions into first and second positions of said exterior frame;

(2) an interior frame pivotally attached to said exterior frame for pivotal motions into first and second positions of said interior frame; and (3) a slide having a first part attached to said interior frame and a second part attached to said exterior frame; said first and second parts each having a sliding surface; when said exterior frame and said interior frame are simultaneously in said first positions, said transfer bridge is in a first operating position in which said sliding surfaces of said first and second parts form a continuous, upwardly facing surface for guiding material thereon between a selected said compartment and said material intake device; when said exterior frame is in said first position and simultaneously said interior frame is in said second position, said transfer bridge is in a second operating position in which a part of said interior frame is oriented upwardly and is adapted to accommodate a container thereon; and when said exterior frame is in said second position and simultaneously said interior frame is in said first position, said transfer bridge is in a third operating position in which said first and second parts of said slide are substantially in a vertical position.

2. The letter sorting system according to claim 1, wherein said interior frame is pivotal on said exterior frame about a first pivot axis and said exterior frame is pivotal about a second pivot axis; and further wherein said first pivot axis is spaced from said second pivot axis.

3. The letter sorting system according to claim 1, wherein said carriage is composed of two parallel, facing, trapezoidal frames, each of said trapezoidal frames having an essentially vertically oriented base.

4. The letter sorting system according to claim 1, wherein said exterior frame is composed of two parallel, facing, essentially U-shaped frames each having a pair of legs and an open side, said legs being oriented horizontally and said open side facing said carriage when said exterior frame is in said first position.

5. The letter sorting system according to claim 1, wherein said interior frame is composed of two parallel, facing, V-shaped frames; said V-shaped frames being upright when said interior and exterior frames are in said first position.

6. The letter sorting system according to claim 1, further comprising holding means for supporting said transfer bridge on said material intake device on a side of the exterior frame closest to said material intake device.

7. The letter sorting system according to claim 1, said transfer bridge further including means for dynamically stabilizing said transfer bridge in each of said operational positions thereof.

8. The letter sorting system according to claim 7, wherein said means for dynamically stabilizing said transfer bridge includes springs.

9. The letter sorting system according to claim 1, wherein said part of said interior frame includes a series of webs for accommodating a container thereon when said transfer bridge is in said second operating position.

10. The letter sorting system according to claim 1, further comprising guide means along opposite sides of said sliding surfaces for preventing said letters from sliding off laterally from said slide.

11. The letter sorting system according to claim 1, wherein said sliding surface of said second part of said slide has a flared terminal portion oriented toward said material intake device in said first operational position of said transfer bridge.

* * * * *